(No Model.) 2 Sheets—Sheet 1.

J. M. DODGE.
FRICTION CLUTCH.

No. 534,499. Patented Feb. 19, 1895.

Witnesses:
R. Schleicher
Alex. Barkoff

Inventor:
James M. Dodge
by his Attorneys
Howson & Howson (No Model.) 2 Sheets—Sheet 2.

J. M. DODGE.
FRICTION CLUTCH.

No. 534,499. Patented Feb. 19, 1895.

Witnesses:
R. Schleicher
Alex. Barkoff

Inventor:
James M. Dodge
by his Attorneys

UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

FRICTION-CLUTCH.

SPECIFICATION forming part of Letters Patent No. 534,499, dated February 19, 1895.

Application filed January 23, 1893. Serial No. 459,421. (No model.)

*To all whom it may concern:*

Be it known that I, JAMES M. DODGE, a citizen of the United States, and a resident of Philadelphia, Pennsylvania, have invented certain Improvements in Friction-Clutches, of which the following is a specification.

The object of my invention is to improve the construction of what may be termed the disk friction clutch, so that the movement of the jaws away from the disk will be positive, and the parts so arranged that the grip will be powerful and the parts strong and compact.

Figure 1:
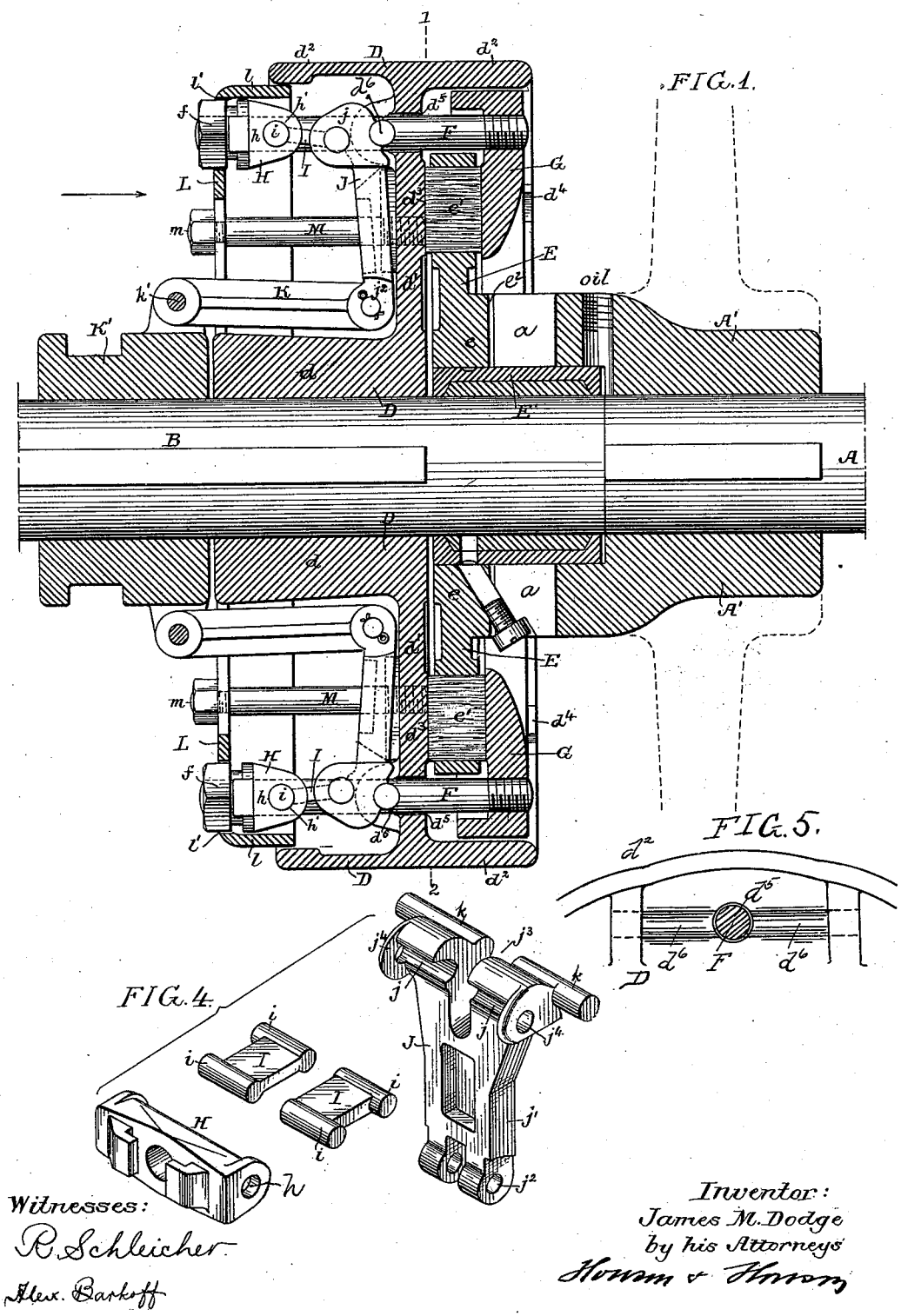
Figure 2:
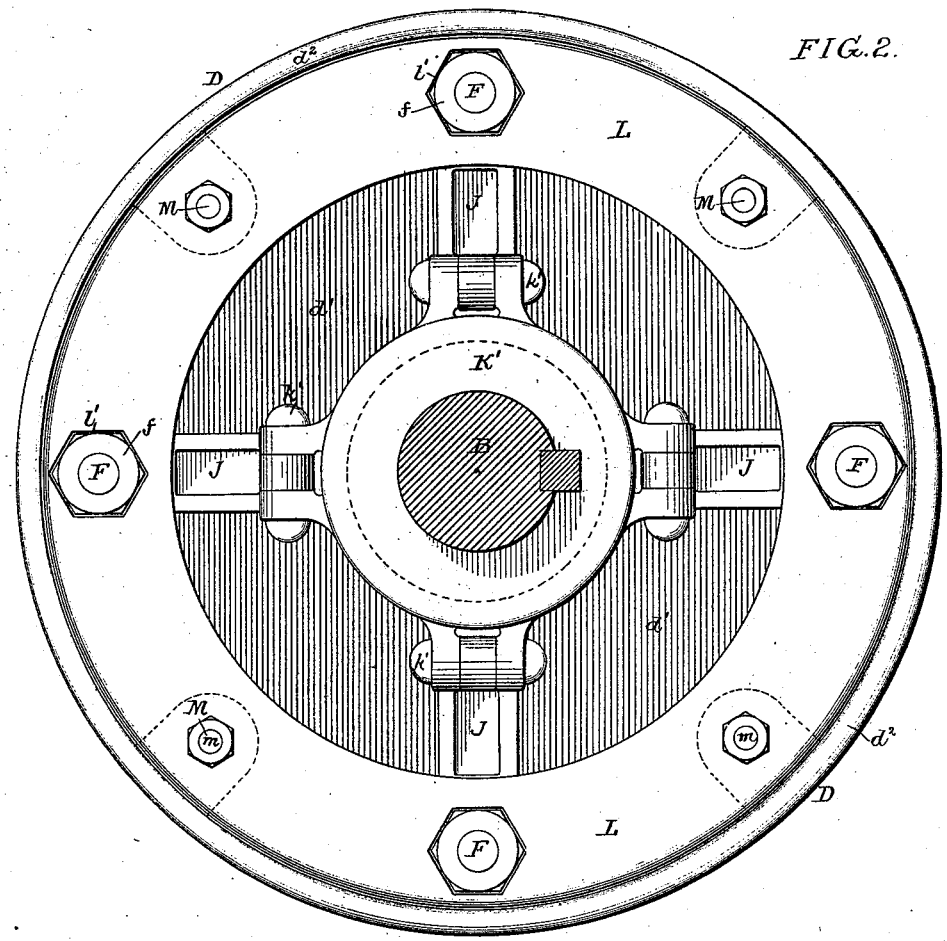
Figure 3:
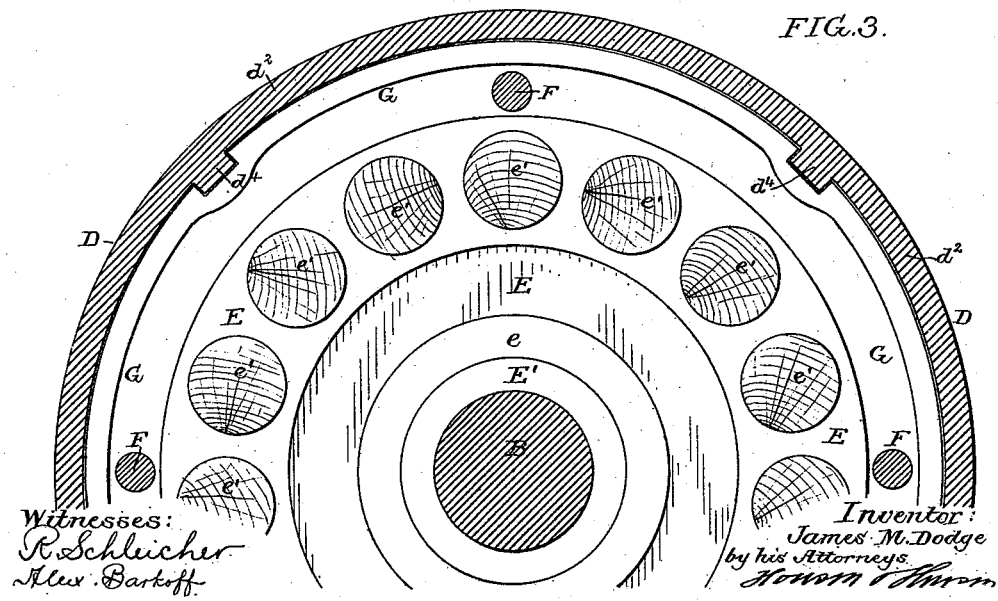

In the accompanying drawings: Figure 1, is a longitudinal sectional view of my improved clutch. Fig. 2, is a view looking in the direction of the arrow, Fig. 1. Fig. 3, is a section on the line 1—2, Fig. 1. Fig. 4, is a perspective view showing parts of the clutch toggle joint detached; and Fig. 5, is a view of a portion of the carrier showing the socket for one of the levers.

The clutch shown in the accompanying drawings is arranged to couple a driving and driven shaft that are in line, but it will be understood that the clutch can be mounted on the driving shaft or driven shaft, and the casing may be used as a pulley or may have gear teeth on its periphery without departing from my invention, or a wheel or pulley may be formed on either of the elements of the clutch, as desired.

In the present instance A is the driving shaft; B, the driven shaft. On the driven shaft is a toothed clutch head A' secured to the shaft by a key, so as to turn therewith. Keyed to the shaft B is the carrier D for the friction clutch mechanism. This carrier consists of a hub $d$, web $d'$ and flange $d^2$, as clearly shown in Fig. 1. The hub is keyed to the shaft B, and the flange $d^2$ may be of a width sufficient to accommodate a belt or may simply form the casing for the clutching mechanism.

E is the disk with which the clutches on the carrier engage. This disk has a hub $e$ provided with teeth $e^2$ which engage with the teeth $a$ on the clutch head A', and carried by the hub is a bushing E' through which passes the end of the shaft B. The object of having the teeth on the head A' and the hub $e$ is to allow for the slight movement of the disk when engaged by the friction clutching mechanism. The disk E is perforated in the present instance, and mounted in the perforations are wooden blocks $e'$. The faces of these wooden blocks extend beyond the line of the faces of the disks, and the friction mechanism engages with the blocks, thus giving a better surface for contact. The blocks can be readily replaced when worn out.

G is a clutching ring adapted to turn with the carrier D, and between this ring and the face $d^3$ of the carrier, is situated the clutching disk E. The ring is notched at intervals, and entering the notches are ribs $d^4$ on the rim $d^2$ of the carrier as clearly shown in Fig. 3, thus insuring the turning of the ring G with the carrier, at the same time taking the strain off the operating bolts F. These operating bolts F are passed through openings $d^5$ in the carrier, and are tapped into the ring G as shown in Fig. 1. On the outer end of each bolt is a nut $f$, back of which is a head H having pockets $h$ for the reception of the heads of links I, the opposite heads of said links resting in pockets $j$ in a lever J, clearly shown in Fig. 4. This lever has extension pivots $k$ resting in sockets $d^6$ in the carrier D. The long arm $j'$ of the lever J is attached at $j^2$ to a link K which is pivoted at $k'$ to an operating sleeve K' suitably grooved for the reception of an operating lever. Thus it will be seen that the links I are connected to the short arm of the lever J, the long arm being connected to the operating sleeve.

The bolt F passes through a slot $j^3$ in the arm, and in order to give the proper strength to the clutching mechanism, I pass the bolt also through the head H, and mount on each side of the bolt a link I. The links are held in place by flanges on the head and on the lever, and the nut $f$ can be so turned as to give the proper pressure. Thus it will be seen that pins are entirely dispensed with at what may be termed the knuckle joint.

The heads $i$ of the links are extended laterally and pass through openings in the flanges $h'$ of the head H, and the flanges $j^4$ of the lever J, so that the movement of the ring toward and from the clutching disk is positive, dispensing with the use of springs to retract the ring as is commonly done. Thus the ring cannot adhere to the disk as is often the case when springs are used. The movement being very limited enables me to exert great pressure upon the disk, and thus make a positive clutch.

In order to prevent the nuts $f$ from turning, and also to protect the parts, I mount a shell L at one side of the clutch, the flange $l$ of the shell passing back of the rim $d^2$ of the carrier D, and openings $l'$ shaped to correspond with the nut $f$, are so made that the nuts extend through the shell as shown in Fig. 1.

Studs M are tacked into the web $d'$ of the carrier, and their reduced ends $m$ pass through openings in the shell L, the said shell resting against the shoulder, and nuts are applied to hold the shell in position. This shell also tends to support the outer ends of the bolts F, taking the strain off of the ring G.

I claim as my invention—

1. The combination in a friction clutch of a shaft, a carrier mounted on said shaft, a friction disk also on the shaft, one of said parts being fixed and the other loose, an operating sleeve, a clutching ring adapted to turn with the carrier, and between which and the carrier the clutching disk is mounted, bolts attached to the ring, and passing through the carrier, a head on each of said bolts, levers adapted to bearings on the carrier, links between the short arms of the levers and the heads on the bolts, the long arms of the levers being connected to the operating sleeve, the whole so arranged that the movement toward and from the clutching disk will be a positive movement, substantially as described.

2. The combination of the shaft, a carrier, and the clutching disk, a clutching ring adapted to turn with the carrier and between which and the carrier the clutching disk is mounted, a series of bolts passing through the web of the carrier and into the clutching ring, a nut on each bolt, a head back of said nut, a forked lever fulcrumed on the carrier, flanges on said lever and flanges on the head, links having pins adapted to pass through the flanges on the lever and head, means for operating said lever, substantially as described.

3. The combination of the carrier, the clutching ring, a clutch disk mounted between the ring and carrier, a series of bolts passing through the carrier and into the ring, a series of levers, each lever being forked and adapted to pass on each side of the bolt, and fulcrumed in bearings on the carrier, a head through which the bolt passes, a nut beyond the head, links on each side of the bolt, pins on said links adapted to pockets in the lever and head, mechanism for operating said lever, whereby when the bolt is inserted the several parts are held in position, substantially as described.

4. The combination of the carrier, the clutching ring, the clutch disk mounted between the ring and carrier, levers for operating the ring, a series of bolts connected to the said levers and nuts on the ends of said bolts, with a shell L mounted on the carrier, having openings conforming to the shape of the nuts, and in which the nuts rest thus preventing them from turning, substantially as described.

5. The combination of the carrier, the clutching ring, the clutching disk, positive lever mechanism for moving the ring toward and from the carrier, a bushing on which the clutching disk is mounted, said bushing being adapted to the shaft, teeth around the said clutching disk, a shaft, a clutch head on said shaft having teeth engaging with the teeth of the friction disk, a shaft in line with the shaft carrying the clutch head, and upon which is mounted the carrier, substantially as described.

6. The combination of the carrier, the clutching ring adapted to turn with the carrier, a clutching disk mounted between the carrier and ring, bolts carried by the ring and passing through the carrier, lever mechanism on said bolts, a nut on the end of each bolt, a shell having openings shaped to correspond with the nuts, and in which the nuts rest, with studs secured to the carrier, said studs having reduced portions which pass through holes in the carrier, with nuts on the studs whereby the shell is held rigidly to the carrier, substantially as described.

In testimony whereof I have signed my name to this specification in the presence of two subscribing witnesses.

JAMES M. DODGE.

Witnesses:
RICHARD W. YERKES,
JAMES B. CRAWFORD.